United States Patent
Busche (10) Patent No.: US 6,496,814 B1
(45) Date of Patent: Dec. 17, 2002

(54) METHOD AND SYSTEM FOR INTEGRATING SPATIAL ANALYSIS, AND SCHEDULING TO EFFICIENTLY SCHEDULE AND MONITOR INFRASTRUCTURE MAINTENANCE

(75) Inventor: Frederick Davis Busche, Highland Village, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 09/619,408

(22) Filed: Jul. 19, 2000

(51) Int. Cl.⁷ .............................. G06F 15/18
(52) U.S. Cl. ....................................... 706/21
(58) Field of Search ............................ 706/21; 370/338

(56) References Cited

U.S. PATENT DOCUMENTS 5,692,107 A * 11/1997 Simoudis et al. ............. 706/12
5,745,751 A * 4/1998 Nelson et al. ............ 707/104.1
5,970,482 A * 10/1999 Pham et al. .................. 706/16

OTHER PUBLICATIONS

"Preventive Maintenance using Data Mining Systems" by V. Gelmi, British Telecommunications Engineering Conf. vol. 18, pt. 2, pp. 50–54.
"Database Mining in the Northern Ireland Housing Executive" by I.C. Magill et al, IEE Colloquium on Knowledge Discovery in Databases' London, UK Feb. 2, 1995, 44pp.

* cited by examiner

Primary Examiner—Thomas Black
Assistant Examiner—Michael B. Holmes
(74) Attorney, Agent, or Firm—Gregory M. Doudnikoff; Carstens, Yee & Cahoon, LLP

(57) ABSTRACT

A method and system for integrating spatial analysis, data mining analysis, and scheduling to efficiently schedule and monitor infrastructure maintenance is provided. The physical locations within a region of infrastructure repairs are identified and data values for characteristics of the infrastructure repairs are compiled and stored. Data mining algorithms are used to generate input data for the formulation of a set of spatial relationships. The locations of the infrastructure repairs within the region are associated with the locations of other infrastructure elements to form a set of spatial relationships. Spatial analysis techniques are used to provide understanding of this set of spatial relationships and how they relate to the location of infrastructure elements that are likely to require maintenance.

25 Claims, 5 Drawing Sheets

METHOD AND SYSTEM FOR INTEGRATING SPATIAL ANALYSIS, AND SCHEDULING TO EFFICIENTLY SCHEDULE AND MONITOR INFRASTRUCTURE MAINTENANCE

CROSS REFERENCE TO RELATED APPLICATIONS

The present invention is related to the following applications entitled "METHOD AND SYSTEM FOR INTEGRATING SPATIAL ANALYSIS AND DATA MINING ANALYSIS TO ASCERTAIN FAVORABLE POSITIONING OF PRODUCTS IN A RETAIL ENVIRONMENT", U.S. application Ser. No. 09/400,543; "METHOD AND SYSTEM FOR INTEGRATING SPATIAL ANALYSIS AND DATA MINING ANALYSIS TO ASCERTAIN WARRANTY ISSUES ASSOCIATED WITH TRANSPORTATION PRODUCTS", U.S. application Ser. No. 09/401,109; and "METHOD AND SYSTEM FOR INTEGRATING SPATIAL ANALYSIS AND DATA MINING ANALYSIS TO ASCERTAIN RELATIONSHIPS BETWEEN COLLECTED SAMPLES AND GEOLOGY WITH REMOTELY SENSED DATA", U.S. application Ser. No. 09/400,776; all of which were filed Sep. 22, 1999, assigned to the same assignee, and incorporated herein by reference.

BACKGROUND OF THE INVENTION

1. Technical Field

The present invention relates to an improved data processing system and, in particular, to a method and system for integrating spatial analysis, data mining analysis, and scheduling to efficiently schedule and monitor infrastructure maintenance.

2. Description of Related Art

The scheduling and monitoring of infrastructural repairs is an important consideration to individuals involved in the administration of state, county, city and building infrastructures. Typically, infrastructural repairs are only instituted when a failure occurs. Thus, for example, water pipe repairs are only performed when a break in a water line is encountered.

Because failures are only addressed after the failure has occurred, the negative impact on the population that makes use of these failed infrastructures is at a maximum. Furthermore, the effect of the failure, and the actual repair process, on other infrastructural components is typically not taken into account when the repair of the failed infrastructure commences.

Thus, it would be beneficial to have a method and system for scheduling and monitoring infrastructural maintenance using predictive techniques such as data mining analysis. In would further be beneficial to have a method and system for scheduling and monitoring infrastructural maintenance that uses techniques, such as spatial analysis, to identify the impact of related infrastructural components to the failed or potentially failing infrastructure.

SUMMARY OF THE INVENTION

The present invention provides a method and system for integrating spatial analysis, data mining analysis, and scheduling to efficiently schedule and monitor infrastructure maintenance. The physical locations within a region of infrastructure repairs are identified and data values for characteristics of the infrastructure repairs are compiled and stored. Data mining algorithms are used to generate input data for the formulation of a set of spatial relationships. The locations of the infrastructure repairs within the region are associated with the locations of other infrastructure elements to form a set of spatial relationships. Spatial analysis techniques are used to provide understanding of this set of spatial relationships and how they relate to the location of infrastructure elements that are likely to require maintenance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
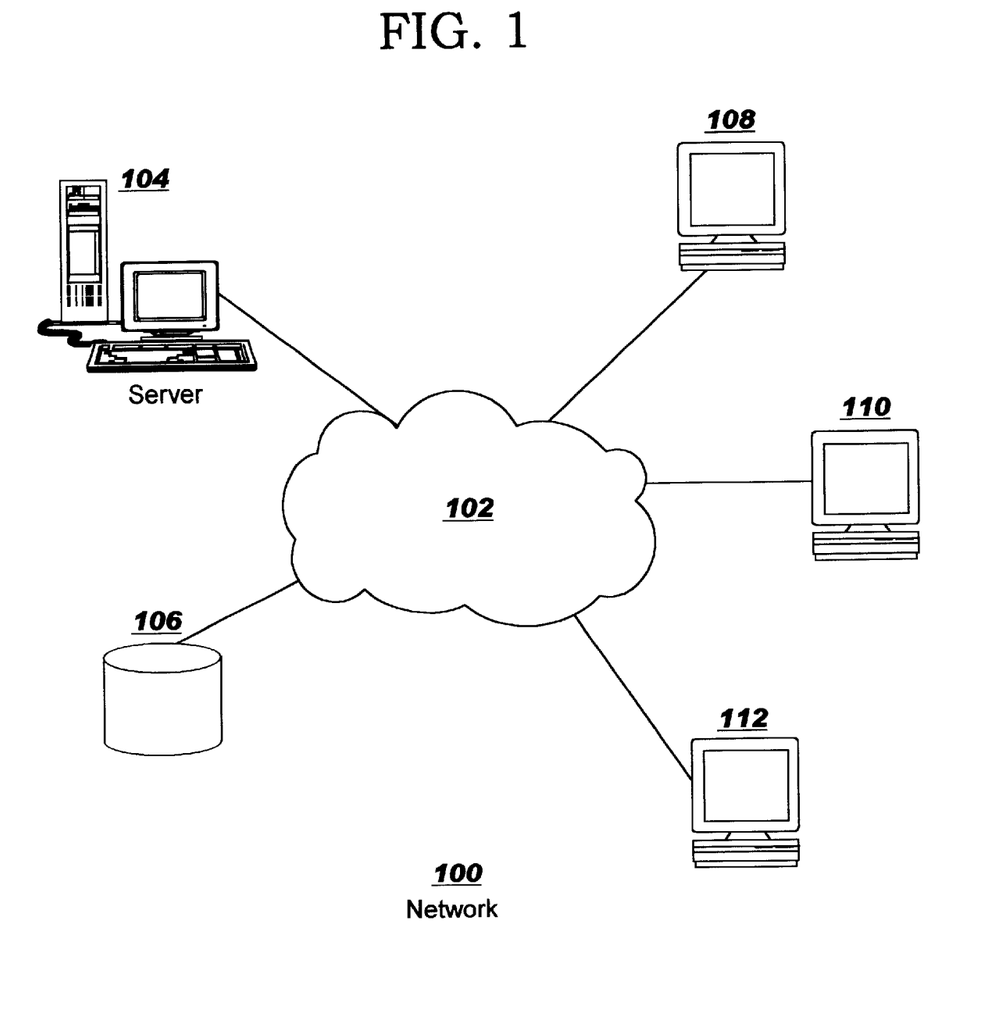
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or infrastructure monitoring systems, such as SKADA (a system that monitors the health of connected parts of an electrical utility distribution network). In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
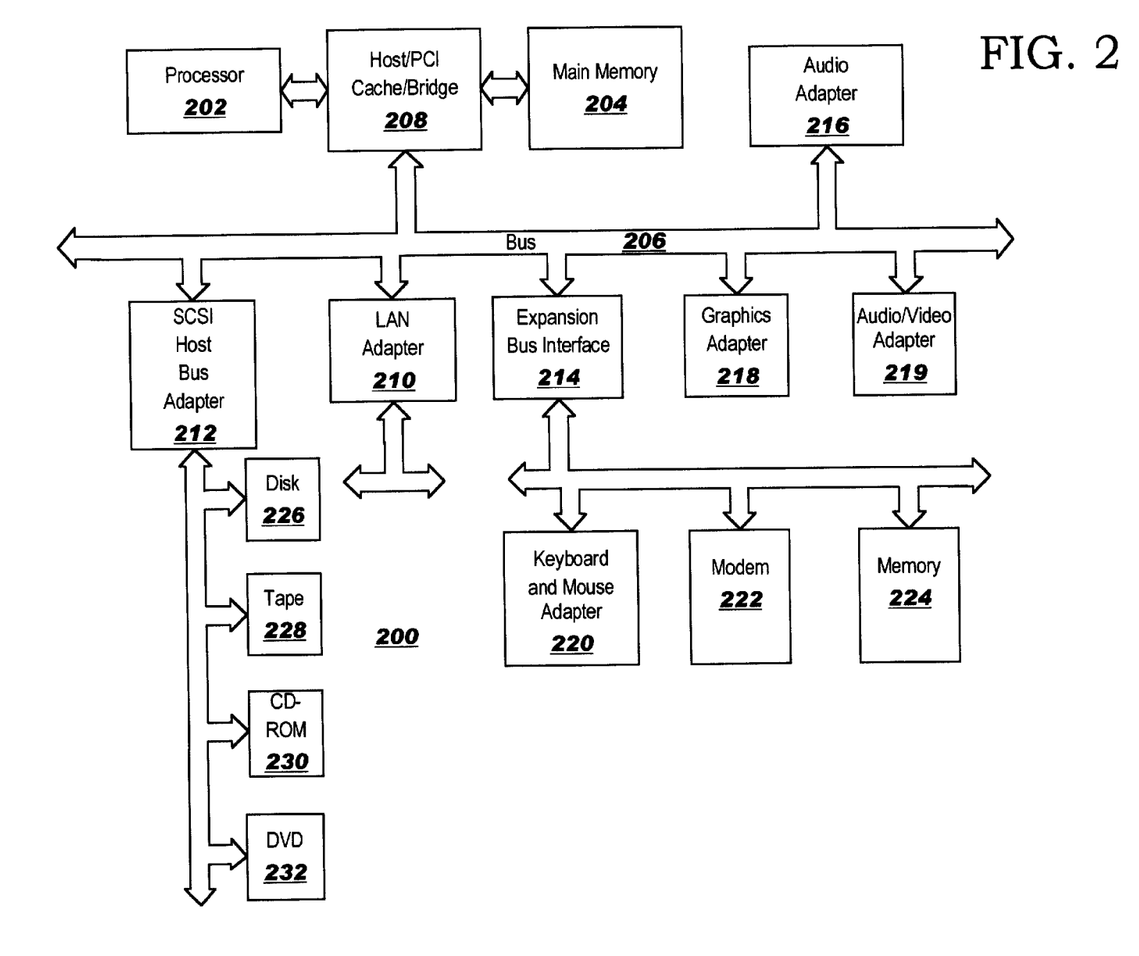
FIG. 2 is a block diagram illustrating a data processing system in which the present invention may be implemented.

With reference now to FIG. 2, a block diagram illustrates a data processing system in which the present invention may be implemented. Data processing system 200 is an example of a client computer. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors. An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Data mining allows a user to search large databases and to discover hidden patterns in the data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

As the present invention relies extensively on the relatively new field of data mining and uses data mining algorithms without proffering a new data mining algorithm per se, a discussion of the general techniques and purposes of data mining are herein provided before a detailed discussion of the implementation of the present invention.

Background on Data Mining

Data mining is a process for extracting relationships in data stored in database systems. As is well-known, users can query a database system for low-level information, such as the value of a particular property of a city road during the last month. Data mining systems, on the other hand, can build a set of high-level rules about a set of data, such as "If the city road is located between the intersection of Alpha Road and Noel Drive and the intersection of Alpha Road and Preston Road, and the age of the city road is 10 years, and the amount of traffic along the city road is predicted to be 1000 automobiles, then the probability of the city road will need repair within the next month is greater than 80%." These rules allow an infrastructure administrator to better understand the relationship between geographic, age and traffic data and allow an infrastructure administrator to make queries, such as "Where should I send my repair crews to prevent probable failure of city roads?" This type of knowledge allows for targeted infrastructure maintenance and helps to guide other strategic decisions. Other applications of data mining include finance, market data analysis, medical diagnosis, scientific tasks, VLSI design, analysis of manufacturing processes, etc. Data mining involves many aspects of computing, including, but not limited to, database theory, statistical analysis, artificial intelligence, and parallel/distributed computing.

Data mining may be categorized into several tasks, such as association, classification, and clustering. There are also several knowledge discovery paradigms, such as rule induction, instance-based learning, neural networks, and genetic algorithms. Many combinations of data mining tasks and knowledge discovery paradigms are possible within a single application.

Data Mining Tasks

An association rule can be developed based on a set of data for which an attribute is determined to be either present or absent. For example, suppose data has been collected on a set of city roads and the attributes are traffic volume and road deterioration. The goal is to discover any association rules between the age of the traffic volume and the amount of road deterioration. Specifically, given two non-intersecting sets of items, e.g., sets X and Y, one may attempt to discover whether there is a rule "if X is 1000 cars, then Y is 5% road deterioration," and the rule is assigned a measure of support and a measure of confidence that is equal or greater than some selected minimum levels. The measure of support is the ratio of the number of records where X is 1000 cars and Y is 5% road determation, divided by the total number of records. The measure of confidence is the ratio of the number of records where X is 1000 cars and Y is 5% road deterioration, divided by the number of records where X is 1000 cars. Due to the smaller number of records in the denominators of these ratios, the minimum acceptable confidence level is higher than the minimum acceptable support level. Returning to city roads as an example, the minimum support level may be set at 0.3 and the minimum confidence level set at 0.8. An example rule in a set of city roads information that meets these criteria might be "if the city road has traffic volume of 1000 cars, then the road deterioration is 5%."

Given a set of data and a set of criteria, the process of determining associations is completely deterministic. Since there are a large number of subsets possible for a given set of data and a large amount of information to be processed, most research has focused on developing efficient algorithms to find all associations. However, this type of inquiry leads to the following question: Are all discovered associations really significant? Although some rules may be interesting, one finds that most rules may be uninteresting since there is no cause and effect relationship. For example, the association "if the city road has a traffic volume of 1000 cars, then the road deterioration is 5%" would also be a reported association with exactly the same support and confidence values as the association "if the road deterioration is 5%, then the traffic volume is 1000 cars."

Classification tries to discover rules that predict whether a record belongs to a particular class based on the values of certain attributes. In other words, given a set of attributes, one attribute is selected as the "goal," and one desires to find a set of "predicting" attributes from the remaining attributes. For example, suppose it is desired to know whether a particular city road will need repairs within the next month. For example, a rather trivial example of this type of rule could include "If the road deterioration is less than 20%, it will not need repairs within the next month." A set of data is presented to the system based on past knowledge; this data "trains" the system. The goal is to produce rules that will predict behavior for a future class of data. The main task is to design effective algorithms that discover high quality knowledge. Unlike an association in which one may develop definitive measures for support and confidence, it is much more difficult to determine the quality of a discovered rule based on classification.

A problem with classification is that a rule may, in fact, be a good predictor of actual behavior but not a perfect predictor for every single instance. One way to overcome this problem is to cluster data before trying to discover classification rules. To understand clustering, consider a simple case were two attributes are considered: traffic volume and road deterioration. These data points can be plotted on a two-dimensional graph. Given this plot, clustering is an attempt to discover or "invent" new classes based on groupings of similar records. For example, for the above attributes, a clustering of data in the range of 1000–1500 car for traffic volume might be found for 5%–7% road deterioration. This cluster could then be treated as a single class.

Clusters of data represent subsets of data where members behave similarly but not necessarily the same as the entire population. In discovering clusters, all attributes are considered equally relevant. Assessing the quality of discovered clusters is often a subjective process. Clustering is often used for data exploration and data summarization.

Knowledge Discovery Paradigms

There are a variety of knowledge discovery paradigms, some guided by human users, e.g. rule induction and decision trees, and some based on AI techniques, e.g. neural networks. The choice of the most appropriate paradigm is often application dependent.

On-line analytical processing (OLAP) is a database-oriented paradigm that uses a multidimensional database where each of the dimensions is an independent factor, e.g., traffic volume vs. road deterioration vs. age of the road. There are a variety of operators provided that are most easily understood if one assumes a three-dimensional space in which each factor is a dimension of a vector within a three-dimensional cube. One may use "pivoting" to rotate the cube to see any desired pair of dimensions. "Slicing" involves a subset of the cube by fixing the value of one dimension. "Roll-up" employs higher levels of abstraction, e.g. moving from traffic volumes-by-road to traffic volumes-by-city block, and "drill-down" goes to lower levels, e.g. moving from traffic volumes-by-road to traffic volumes-by-intersection.

The Data Cube operation computes the power set of the "Group by" operation provided by SQL. For example, given a three dimension cube with dimensions A, B, C, then Data Cube computes Group by A, Group by B, Group by C, Group by A,B, Group by A,C, Group by B,C, and Group by A,B,C. OLAP is used by human operators to discover previously undetected knowledge in the database.

Recall that classification rules involve predicting attributes and the goal attribute. Induction on classification rules involves specialization, i.e. adding a condition to the rule antecedent, and generalization, i.e. removing a condition from the antecedent. Hence, induction involves selecting what predicting attributes will be used. A decision tree is built by selecting the predicting attributes in a particular order, e.g., road deterioration, age of road, traffic volume.

The decision tree is built top-down assuming all records are present at the root and are classified by each attribute value going down the tree until the value of the goal attribute is determined. The tree is only as deep as necessary to reach the goal attribute. For example, if no city roads in the northwest quarter of Plano, Tex. have a deterioration of 35%, then the value of the goal attribute "Road deterioration 35%?" would be determined (value equals "No") once the area is known to be the northwest quarter of Plano, Tex. However, if the area is the southeast quarter of Plano, Tex., it may be necessary to look at other predicting attributes to determine the value of the goal attribute. A human is often involved in selecting the order of attributes to build a decision tree based on "intuitive" knowledge of which attribute is more significant than other attributes.

Decision trees can become quite large and often require pruning, i.e. cutting off lower level subtrees. Pruning avoids "overfitting" the tree to the data and simplifies the discovered knowledge. However, pruning too aggressively can result in "underfitting" the tree to the data and missing some significant attributes.

The above techniques provide tools for a human to manipulate data until some significant knowledge is discovered and removes some of the human expert knowledge interference from the classification of values. Other techniques rely less on human intervention. Instance-based learning involves predicting the value of a tuple, e.g., predicting if someone of a particular age and gender will buy a product, based on stored data for known tuple values. A distance metric is used to determine the values of the N closest neighbors, and these known values are used to predict the unknown value.

For example, given a particular traffic volume and age of a city road in which the tuple value is not known, if among the 20 nearest neighbors, 15 city roads showed a particular road deterioration and 5 samples did not, then it might be predicted that the value of this new tuple would be "has a road deterioration of X." This technique does not discover any new rules, but it does provide an explanation for the classification, namely the values of the closest neighbors.

The final technique examined is neural nets. A typical neural net includes an input layer of neurons corresponding to the predicting attributes, a hidden layer of neurons, and an output layer of neurons that are the result of the classification. For example, there may be eight input neurons corresponding to "under 10% road deterioration", "between 10% and 20% road deterioration", "over 20% road deterioration", "in Plano, Texas", "traffic volume below 1000 automobiles", "traffic volume above 1000 automobiles", and "age greater than 10 years." There could be two output neurons: "will need repair within next month" and "will not need repair within next month". A reasonable number of neurons in the middle layer is determined by experimenting with a particular known data set.

There are interconnections between the neurons at adjacent layers that have numeric weights. When the network is trained, meaning that both the input and output values are known, these weights are adjusted to give the best performance for the training data. The "knowledge" is very low level (the weight values) and is distributed across the network. This means that neural nets do not provide any comprehensible explanation for their classification behavior-they simply provide a predicted result.

Neural nets may take a very long time to train, even when the data is deterministic. For example, to train a neural net to recognize an exclusive-or relationship between two Boolean variables may take hundreds or thousands of training data (the four possible combinations of inputs and corresponding outputs repeated again and again) before the neural net learns the circuit correctly. However, once a neural net is trained, it is very robust and resilient to noise in the data. Neural nets have proved most useful for pattern recognition tasks, such as recognizing handwritten digits in a zip code.

Other knowledge discovery paradigms can be used, such as genetic algorithms. However, the above discussion presents the general issues in knowledge discovery. Some techniques are heavily dependent on human guidance while others are more autonomous. The selection of the best approach to knowledge discovery is heavily dependent on the particular application.

Data Warehousing

The above discussions focused on data mining tasks and knowledge discovery paradigms. There are other components to the overall knowledge discovery process.

Data warehousing is the first component of a knowledge discovery system and is the storage of raw data itself. One of the most common techniques for data warehousing is a relational database. However, other techniques are possible, such as hierarchical databases or multidimensional databases. Data is nonvolatile, i.e. read-only, and often includes historical data. The data in the warehouse needs to be "clean" and "integrated". Data is often taken from a wide variety of sources. To be clean and integrated means data is represented in a consistent, uniform fashion inside the warehouse despite differences in reporting the raw data from various sources.

There also has to be data summarization in the form of a high level aggregation. For example, consider a phone number 111-222-3333 where 111 is the area code, 222 is the exchange, and 3333 is the phone number. The telephone company may want to determine if the inbound number of calls is a good predictor of the outbound number of calls. It turns out that the correlation between inbound and outbound calls increases with the level of aggregation. In other words, at the phone number level, the correlation is weak but as the level of aggregation increases to the area code level, the correlation becomes much higher.

Data Pre-processing

After the data is read from the warehouse, it is preprocessed before being sent to the data mining system. The two pre-processing steps discussed below are attribute selection and attribute discretization.

Selecting attributes for data mining is important since a database may contain many irrelevant attributes for the purpose of data mining, and the time spent in data mining can be reduced if irrelevant attributes are removed beforehand. Of course, there is always the danger that if an attribute is labeled as irrelevant and removed, then some truly interesting knowledge involving that attribute will not be discovered.

If there are N attributes to choose between, then there are $2^N$ possible subsets of relevant attributes. Selecting the best subset is a nontrivial task. There are two common techniques for attribute selection. The filter approach is fairly simple and independent of the data mining technique being used. For each of the possible predicting attributes, a table is made with the predicting attribute values as rows, the goal attribute values as columns, and the entries in the table as the number of tuples satisfying the pairs of values. If the table is fairly uniform or symmetric, then the predicting attribute is probably irrelevant. However, if the values are asymmetric, then the predicting attribute may be significant.

The second technique for attribute selection is called a wrapper approach where attribute selection is optimized for a particular data mining algorithm. The simplest wrapper approach is Forward Sequential Selection. Each of the possible attributes is sent individually to the data mining algorithm and its accuracy rate is measured. The attribute with the highest accuracy rate is selected. Suppose attribute 3 is selected; attribute 3 is then combined in pairs with all remaining attributes, i.e., 3 and 1, 3 and 2, 3 and 4, etc., and the best performing pair of attributes is selected.

This hill climbing process continues until the inclusion of a new attribute decreases the accuracy rate. This technique is relatively simple to implement, but it does not handle interaction among attributes well. An alternative approach is backward sequential selection that handles interactions better, but it is computationally much more expensive.

Discretization involves grouping data into categories. For example, age in years might be used to group persons into categories such as minors (below 18) young adults (18 to 39), middle-agers (40–59), and senior citizens (60 or above). Some advantages of discretization is that it reduces the time for data mining and improves the comprehensibility of the discovered knowledge. Categorization may actually be required by some mining techniques. A disadvantage of discretization is that details of the knowledge may be suppressed.

Blindly applying equal-weight discretization, such as grouping ages by 10 year cycles, may not produce very good results. It is better to find "class-driven" intervals. In other words, one looks for intervals that have uniformity within the interval and have differences between the different intervals.

Data Post-processing

The number of rules discovered by data mining may be overwhelming, and it may be necessary to reduce this number and select the most important ones to obtain any significant results. One approach is subjective or user-driven. This approach depends on a human's general impression of the application domain. For example, the human user may propose a rule such as "if a city road has a traffic volume that is less than 1000 automobiles, then the city road has a lower chance of needing repairs." The discovered rules are then compared against this general impression to determine the most interesting rules. Often, interesting rules do not agree with general expectations. For example, although the conditions are satisfied, the conclusion is different than the general expectations. Another example is that the conclusion is correct, but there are different or unexpected conditions.

Rule affinity is a more mathematical approach to examining rules that does not depend on human impressions. The affinity between two rules in a set of rules $\{R_i\}$ is measured and given a numerical affinity value between zero and one, called $Af(R_x,R_y)$. The affinity value of a rule with itself is always one, while the affinity with a different rule is less than one. Assume that one has a quality measure for each rule in a set of rules $\{R_i\}$, called $Q(R_i)$. A rule $R_j$ is said to be suppressed by a rule $R_k$ if $Q(R_j) < Af(R_j,R_k) * Q(R_k)$. Notice that a rule can never be suppressed by a lower quality rule since one assumes that $Af(R_j,R_k) < 1$ if $j \neq k$. One common measure for the affinity function is the size of the intersection between the tuple sets covered by the two rules, i.e. the larger the intersection, the greater the affinity.

Data Mining Summary

The discussion above has touched on the following aspects of knowledge processing: data warehousing, pre-processing data, data mining itself, and post-processing to obtain the most interesting and significant knowledge. With large databases, these tasks can be very computationally intensive, and efficiency becomes a major issue. Much of the research in this area focuses on the use of parallel processing. Issues involved in parallelization include how to partition the data, whether to parallelize on data or on control, how to minimize communications overhead, how to balance the load between various processors, how to automate the parallelization, how to take advantage of a parallel database system itself, etc.

Many knowledge evaluation techniques involve statistical methods or artificial intelligence or both. The quality of the knowledge discovered is highly application dependent and inherently subjective. A good knowledge discovery process should be both effective, i.e. discovers high quality knowledge, and efficient, i.e. runs quickly.

Integrating Spatial Analysis and Discovery Based Data Mining Analysis to Perform Maintenance Scheduling and Monitoring There are basically three key aspects to infrastructure data, as touched on above. One aspect is the piece or part of the infrastructure that requires repair as an individual and the second is all of the factors or attributes that are associated with the part or piece of the infrastructure that needs repair. These attributes may include, for example, the age, materials, manufacturer, use, and the like. Taking the city road example used above, the attributes may include traffic volume, type of material the road is made out of (concrete, blacktop, dirt, etc.), the age of the road, the last time the road was repaired, the amount of the road that was last repaired, and the like.

The third aspect of infrastructure data is the spatial relationship or location of the part or piece of the infrastructure needing repair with respect to the location of other infrastructural parts, heavy users, unusual demands on use, and the like. For example, the spatial relationship information may include a geographic position, the relative distance between the road and a sports arena, a highway, a shopping mall, a government building, or the like.

Discovery-based data mining allows for the understanding of the parts or pieces of the infrastructure and repairs that have occurred in the past such that prediction of failure can be used for planning of future preventive maintenance. Spatial Analysis allows for the relationship of these products with respect to each other and rerouting flows that may be necessary while repairs are taking place as well as allowing for the identification of patterns with respect to location of specific kinds of repair.

Using data mining, the time for preventive maintenance to be done can be scheduled so that there is the least impact on the public. Furthermore, spatial analysis, to look at routing changes and the like, may be used to schedule and budget repairs more efficiently to provide a cost savings by being able to predict and budget before a failure occurs.

Discovery-based data mining allows for the understanding of the relationships between diverse data types. Patterns in infrastructure data can be correlated with maintenance requirements and the model can be replicated to find similar occurrences. As noted above in the description of general data mining techniques, data mining alone may provide interesting relationships. For example, data mining within a database of data from a city's department of transportation may reveal a rule such as increased traffic volume along road "X" coincides with increased road deterioration.

However, data mining alone cannot provide further information concerning relationships between the locations of infrastructure attributes, such as road deterioration, and where an infrastructure administrator should send repair crews to reduce the likelihood of infrastructure failures. Furthermore, an infrastructure administrator may be interested in finding out where future failures in the infrastructure, such as potholes in the city roads, traffic light outages, subway system failures, and the like, are most likely to occur and where the infrastructure administrator should concentrate efforts to avoid such potential failures.

Spatial analysis allows for the relative locations of these data to be addressed. For example, a city or state department of transportation may collect significant amounts of data using a variety of sources to provide indications of usage of roads, their repair histories, and other pertinent statistical data. With a scarcity of data in certain areas, a modeling tool provides some predictive capability to the known values by creating intermediate values. Using different types of spatial analysis techniques, values between the areas in which data has been accumulated may be predicted, and a model of the city roads that shows various characteristics in the data may then be constructed in order to predict unknown values between the known values.

By storing the data in the database based on geographical positioning, or positioning relative to similar infrastructural elements, an analysis of the relationship of all data points to each other can be accomplished. This allows for a more efficient and more accurate identification of potential trouble spots in the infrastructure.

Accurate positioning of data collection points is essential to the integration of all of these techniques. When an infrastructural failure occurs, the data compiled about the infrastructural failure must be included in the database along with accurate position information. This accurate position information may be, for example, a position based on a city map, a position based on latitude and longitude coordinates, based on global positioning system (GPS) data, and the like.

In many cases this input is based upon a technician that is associated with the repair entering readings from a GPS unit into a data collection device to be transmitted to the data warehouse. In other cases, such as a utility system with a SKADA monitoring system connected to the data warehouse, this information would be entered automatically into the data warehouse. Monitoring systems, when used, will enter not only the repair made and the date and time but all other relevant information including the X, Y, and Z components of the location of the repair. This invention concerns the use of all data entered into the data warehouse without regard to the source, whether it be automatically detected as with a SKADA or by manual entry as might be required by a repair technician.

In some instances, data may be smoothed to reduce noise introduced into the data while maintaining indicators of general trends in the data. By smoothing the data, much of the detailed information regarding infrastructural failures may be lost. Thus, in the case of the present invention, the individual data points are not disturbed by smoothing. The alignment of historical failure data and position information may provide fine correlations that appear when doing discovery-based data mining.

For example, an infrastructure that is located in a rural environment may have different characteristics associated with failures than one that is located in a warehouse environment. This may be due to, for example, the uses of the infrastructure pieces or conditions under which those pieces are being used. Without spatial analysis associated with the analysis of failures, recognition of regional patterns may not be discovered. Discover based data mining will allow for the association and segmentation of repairs such that they can be classified and understood with respect to age, history of use, and the like. Without the use of spatial analysis in combination with discovery based data mining, the spatial relationships of the discovery based data mining patterns cannot be understood.

In addition, by using the combination of spatial analysis and discovery based data mining, the potential impact of infrastructure failures on downstream systems or public disruption of services may be predicted and avoided. Aspects of individual infrastructure piece usage along with various use scenarios and infrastructure piece specifications can be analyzed to identify potential harmful usages. A relationship between proper usage of an infrastructural piece with potential out of compliance use factors can be assessed and a thorough assessment of infrastructure pieces can be completed. Once these relationships are known, scheduling of maintenance can be accomplished to avoid infrastructural failures.

Figure 3:
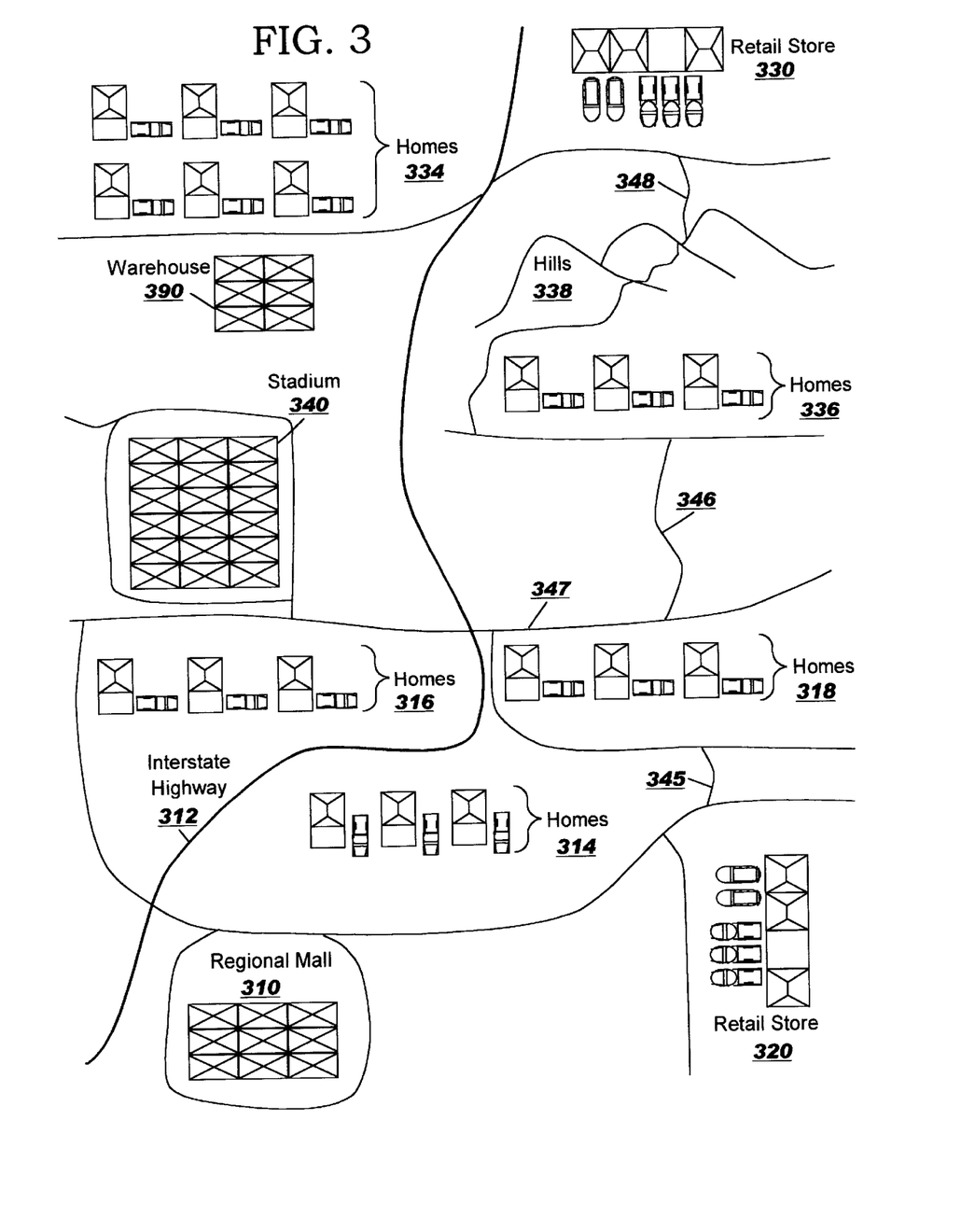
FIG. 3 is a diagram that depicts various infrastructural objects upon which information, including spatial information, may be gathered for ascertaining relationships between data points.

With reference to FIG. 3, a diagram illustrating a road system for a portion of a hypothetical geographical location. FIG. 3, shows the spatial relationships between various roads and structures that may have an impact on the usage of those roads, such as the homes 314, 316, 318, 334 and 336, the regional mall 310, the retail stores 320 and 330, and the stadium 340.

Through the use of data mining analysis, several rules may be developed for identifying infrastructural failure patterns of the roads shown in FIG. 3. In the example, regional mall 310 may have particular traffic volumes that change during various parts of a year. For example, the traffic volume at regional mall 310 may be heavier during the Christmas holiday season than during the summer months. Similarly, the stadium 340 may have higher traffic volume during football season than during soccer season. As a result, the deterioration of the roads adjacent these structures may be greater during various periods of the year. Furthermore, roads that are further away from these structures may undergo less deterioration during all periods of the year and thus, require less maintenance.

As a further example, by utilizing population profile information identifying addresses of individuals, their work addresses, the numbers of people attending sporting events, the number of sales at retail stores and regional shopping malls, traffic volumes may be estimated for various roads. For example, the ZIP codes within the addresses of the population profiles could be used to discern regional patterns based on clustering of persons attending sporting events at the stadium 340 based on ZIP codes. Hence, a rule concerning regional patterns developed through data mining analysis may contain some amount of spatial content. However, as explained further below, other spatial information could not be extracted from a simple data mining analysis of the purchase transaction database, even though the spatial analysis techniques may access the ZIP code information in the population profiles as one source of spatial information.

Homes 314, 316, 318, 334, and 336 are shown as the points of origin for persons shopping at retail stores 320 and 330, regional mall 310, and attending sporting events at stadium 340. A retail establishment may store the address of a customer in association with other customer information. For example, if a customer receives service calls from a retail establishment, the retail establishments would have customer records containing customer addresses. In addition, the address of certain customers may be determined through credit card transactions, etc. The addresses provide additional spatial information which may be correlated with the places at which the customer shops to identify probable travel patterns of the customer, during data post-processing. Similar information may be obtained for identifying individuals attending sporting events at the stadium 340.

Regional mall 310 is located near interstate highway 312 in order to provide easy access to a large number of shoppers. Customers living in homes 314–318 may frequently purchase products from regional mall 310, occasionally buy products at retail store 320, and very infrequently shop at retail store 330. Customers living in homes 334–336 shop less frequently at regional mall 310 and infrequently at retail store 320.

Of greater significance is the rule developed during data mining analysis that, while homes 334 and homes 336 are approximately equidistant from retail store 330, customers living in homes 334 shop at retail store 330 much more frequently than customers living in homes 336. In addition, although retail store 330 is closer to customers living in homes 336, these customers are much more likely to shop at retail store 320.

By simply data mining various databases in order to discover relationships between road usage and need for repair, the infrastructure administrator may be unable to discern a pattern in the road usage and the need for repair other than that with increase road usage, repair is generally needed more often. If the infrastructure administrator is provided with spatial information, such as spatial information concerning the roads that access the department store warehouse 390, he/she can better assess not only the frequency of delivery of products to the retail stores but also can analyze the impact of higher weight vehicles on road repair frequency. Likewise, through further spatial analysis, it may become clearly apparent why the roadways near the regional mall 310 and the stadium 340 require greater frequency of repair than the road 345, for example.

By using a geographic information system (GIS) in order to obtain information concerning man-made and geographic features in the region of interest, it is possible to plot subregions with other geographically or spatially related information to discern more precise spatial relationships. By discovering that the customers living in homes 336 live near hills 338, it may be confirmed that the roads through the rural hills create navigational difficulties or result in longer travel times. Hence, customers living in homes 336 would rather drive longer distances through suburban streets to reach retail store 320 than driving to retail store 330. Thus, the roads 346 and 347 may require more maintenance than the road 348 running through the hills 338.

Without performing spatial analysis in conjunction with data mining analysis, the causes of regional patterns may not be discovered. Discovery-based data mining alone merely allows for the association and segmentation of infrastructural pieces such that they can be classified. Without the use of spatial analysis in combination with discovery-based data mining, the spatial relationships of the discovery-based data mining patterns may not be able to be understood.

Once the data mining analysis and the spatial analysis has been completed, a scheduling subsystem may generate a schedule of maintenance for the various roads in the depict area. The schedule may show that more frequent maintenance of the roadways near the stadium 340 and regional mall 310 are required during the months of October through December. Scheduled maintenance of roads 345 and 348 are set to a minimum or set to a level such that maintenance is only performed in the summer when snow and ice are not an issue for the residents or repair crews.

Figure 4:
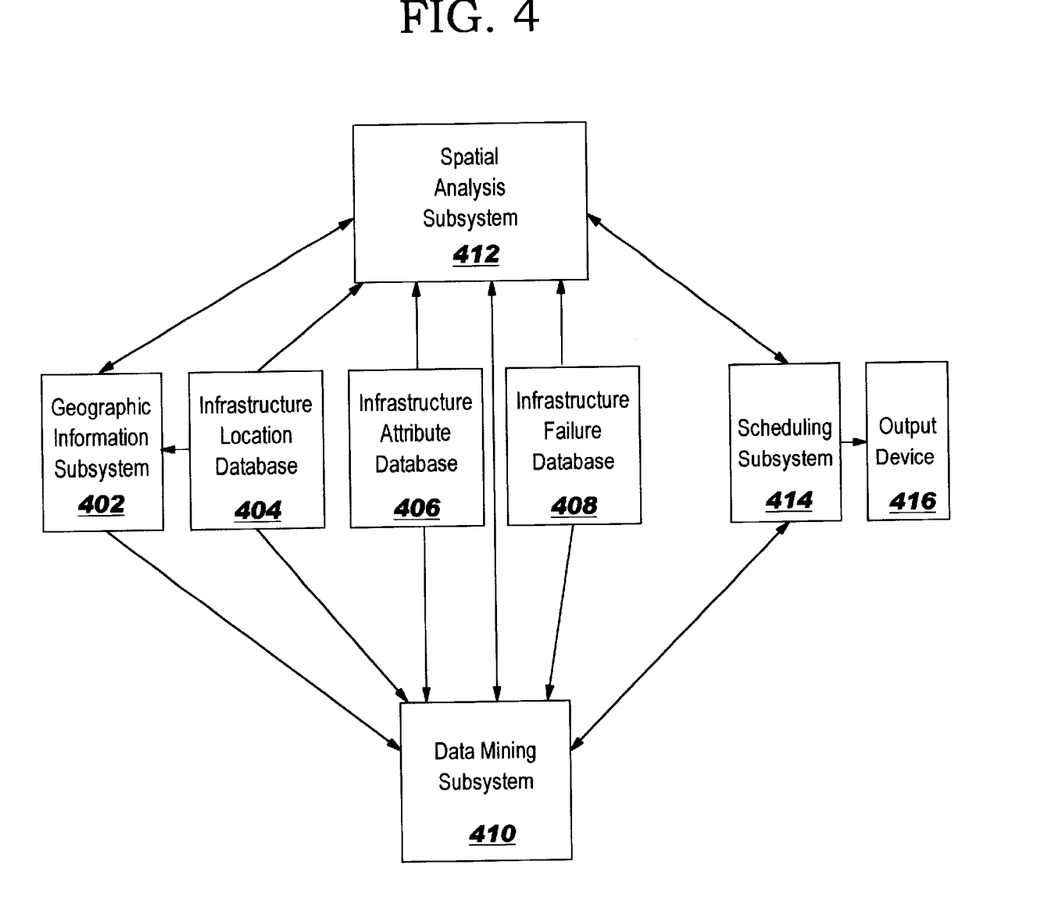
FIG. 4 is a block diagram depicting the elements that may be used in a data processing system implementing the present invention.

With reference now to FIG. 4, a block diagram depicts the components that may be used in a data processing system implementing the present invention. Geographic Information Subsystem (GIS) 402 stores positioning information to correlate the positions of the infrastructure data points within an area as stored within infrastructure location database 404.

Infrastructure location database 404 may contain positional coordinates of an infrastructure piece and other associated information. Infrastructure attribute database 406 may contain information identifying attributes of the various pieces or parts of the infrastructure. Infrastructure failure database 408 contains information identifying failures of infrastructural pieces and the causes of those failures.

Data mining subsystem 410 uses infrastructure location database 404, infrastructure attribute database 406, and infrastructure failure database 408 to discover relationships between the infrastructure locations, the infrastructure attributes and the infrastructure failures. Spatial analysis subsystem 412 uses infrastructure location database 404, infrastructure attribute database 406 and geographic information subsystem 402 to process, plot, and display spatial information.

Scheduling subsystem 414 uses the relationship information obtained from the data mining subsystem 410 and the spatial information obtained from the spatial analysis subsystem 412 to schedule maintenance for various infrastructural pieces or parts. This scheduling information may then be provided via the output device 415, such that maintenance crews may be dispatched for performing maintenance on the infrastructural pieces or parts in an effort to avoid failures before they occur.

GIS 402, data mining subsystem 410, spatial analysis subsystem 412 and Scheduling subsystem 414 transfer information as appropriate. GIS 402 may process position information as necessary for either spatial analysis subsystem 412 or data mining subsystem 410. Spatial analysis subsystem 412 receives relationship data from data mining subsystem 410 for plotting and displaying spatial relationships and may return feedback information concerning spatial relationships to data mining subsystem 410. Spatial analysis subsystem 412 and data mining subsystem 410 may provide results to scheduling subsystem 414 which generates a schedule of maintenance for the infrastructure. This schedule of maintenance, along with graphical spatial information, may be provided to output device 415 for use by a human user. The output device 415 may include, for example, a display device that incorporates the results into various displays for human interpretation and viewing.

Other databases may be provided, or the databases above may be combined in alternate arrangements of information. The example databases provided above are not meant to be interpreted as limitations with respect to the present invention.

Figure 5:
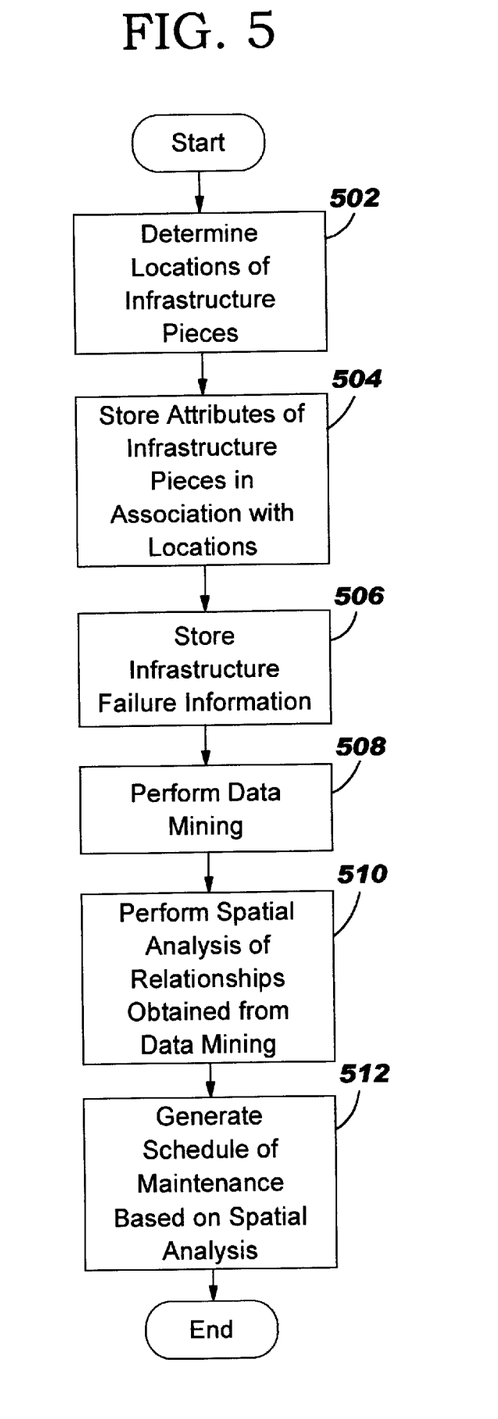
FIG. 5 is a flowchart depicting a process for integrating spatial analysis with data mining for performing infrastructural maintenance scheduling.

With reference now to FIG. 5, a flowchart depicts a process for integrating spatial analysis with data mining to perform scheduling of infrastructure maintenance. The process begins with precise determination of locations of infrastructure pieces within a region using positional information (step 502). The attributes of the infrastructural pieces are then stored in association with their locations (step 504). Infrastructure failure information is stored in an infrastructure failure database (step 506). These databases are then mined using data mining algorithms to find relationships among the spatial locations of the infrastructure pieces, their attributes and prior failures (step 508). Potentially valuable data relationships are then processed through spatial analysis to determine whether the location of the infrastructure failures within the area confirm or contradict interesting anomalies within the attribute data (step 510). Thereafter, scheduling of maintenance can be performed based on the results of the data mining, the spatial analysis, and any other scheduling based analytical procedures (step 512).

Spatial analysis of the collected data may include the use of geostatistical algorithms that allow for the prediction of intermediate values for the data or may allow for the addition or subtraction of data layers or themes one from the other. The resulting maps of the data analysis would illustrate the most prospective area or volume to concentrate more maintenance crews. The technique of integrating the results of data mining with spatial analysis is less sensitive to the bias that may be applied by the expert and allow for the discovery of unknown spatial patterns that occur with respect to the collected data and the location of an potential infrastructure failures.

The advantages of the present invention should be apparent in view of the detailed description provided above. One can conclude that the need for a tool to assess spatial relationships allows one to complete the part or piece-use-public impact picture by allowing the assessment of failures within the confines of where these particular parts or pieces are located. This assessment is very difficult or impossible without the plotting of the failure locations on a map and observing the resulting patterns. However, this may result in the masking of very important relationships by ones that are more bold in nature.

For a complete solution that relates failures and the potential for failure, all aspects associated with that infrastructure piece, its use, and how it got to its ultimate deteriorated condition must be analyzed. Using discovery based data mining algorithms that address the segmentation of data concerning the failures into different segments (demographic clustering), the association of infrastructure pieces to observe failure patterns (association analysis), classification rules that predict failure of parts based upon a series of rules (binary and neural net tree analysis), and prediction of the segments of infrastructure pieces and other attributes that would predict failure would be very important for the understanding of infrastructure failures that result in disruption of service.

By using spatial analysis, the precise location of the segmented or associated failures may be plotted to assess unusual use. For example, spatial analysis may be used to assess unusual use such as roads near warehouses where large trucks are used vs. residential roads, differences in environmental conditions, differences in types of materials used, which repair to do first and how it will affect traffic flow or other factors, and the like. When the above conditions are understood, efficient scheduling of maintenance can be performed to prevent catastrophic failures.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for predicting locations of infrastructural elements that are likely to require maintenance, comprising:
   recording location information of infrastructure repairs within the region;
   recording characteristic data associated with characteristics of the infrastructure repairs; and
   identifying infrastructure elements that are likely to require maintenance based on the location information and the characteristic data.

2. The method of claim 1, further comprising:
   employing one or more data mining algorithms to generate input data for formulation of a set of spatial relationships.

3. The method of claim 1, further comprising:
   employing one or more spatial analysis algorithms to form the set of spatial relationships.

4. The method of claim 1, wherein the location information is obtained using a position identifying system.

5. The method of claim 4, wherein the position identifying system includes at least one of a global positioning system, enhanced global positioning system, and SKADA.

6. The method of claim 1, further comprising:
   scheduling maintenance for the infrastructure elements based on the identification of the infrastructure elements.

7. The method of claim 1, further comprising:
   identifying the impact of a failure of the infrastructure elements on other infrastructure elements.

8. The method of claim 6, further comprising:
   identifying alternate infrastructure elements for use while maintenance is performed on the identified infrastructural elements.

9. The method of claim 1, wherein identifying infrastructure elements that are likely to require maintenance includes employing one or more data mining algorithms to predict whether the infrastructure elements are likely to require maintenance, and employing one or more spatial analysis algorithms to identify relationships between the infrastructure elements.

10. A computer program product in a computer readable medium for predicting locations of infrastructural elements that are likely to require maintenance, comprising:
    first instructions for recording location information of infrastructure repairs within the region;
    second instructions for recording characteristic data associated with characteristics of the infrastructure repairs; and
    third instructions for identifying infrastructure elements that are likely to require maintenance based on the location information and the characteristic data.

11. The computer program product of claim 10, further comprising:
    fourth instructions for employing one or more data mining algorithms to generate input data for formulation of a set of spatial relationships.

12. The computer program product of claim 10, further comprising:
    fourth instructions for employing one or more spatial analysis algorithms to form the set of spatial relationships.

13. The computer program product of claim 10, further comprising:
    fourth instructions for scheduling maintenance for the infrastructure elements based on the identification of the infrastructure elements.

14. The computer program product of claim 10, further comprising:
    fourth instructions for identifying the impact of a failure of the infrastructure elements on other infrastructure elements.

15. The computer program product of claim 14, further comprising:
    fifth instructions for identifying alternate infrastructure elements for use while maintenance is performed on the identified infrastructural elements.

16. The computer program product of claim 10, wherein the third instructions for identifying infrastructure elements that are likely to require maintenance include instructions for employing one or more data mining algorithms to predict whether the infrastructure elements are likely to require maintenance, and instructions for employing one or more spatial analysis algorithms to identify relationships between the infrastructure elements.

17. An apparatus for predicting locations of infrastructural elements that are likely to require maintenance, comprising:
    first storage means for storing location information of infrastructure repairs within the region;
    second storage means for storing characteristic data associated with characteristics of the infrastructure repairs; and a processor coupled to the first storage means and the second storage means, that identifies infrastructure elements that are likely to require maintenance based on the location information in the first storage means and the characteristic data in the second storage means.

18. The apparatus of claim 17, wherein the processor employs one or more data mining algorithms to generate input data for formulation of a set of spatial relationships.

19. The apparatus of claim 17, wherein the processor employs one or more spatial analysis algorithms to form the set of spatial relationships.

20. The apparatus of claim 17, further comprising a position identifying system, wherein the location information is obtained using the position identifying system.

21. The apparatus of claim 20, wherein the position identifying system includes at least one of a global positioning system, enhanced global positioning system, and SKADA.

22. The apparatus of claim 17, wherein the processor schedules maintenance for the infrastructure elements based on the identification of the infrastructure elements.

23. The apparatus of claim 17, wherein the processor identifies the impact of a failure of the infrastructure elements on other infrastructure elements.

24. The apparatus of claim 23, wherein the processor identifies alternate infrastructure elements for use while maintenance is performed on the identified infrastructural elements.

25. The apparatus of claim 17, wherein the processor identifies infrastructure elements that are likely to require maintenance using one or more data mining algorithms to predict whether the infrastructure elements are likely to require maintenance, and one or more spatial analysis algorithms to identify relationships between the infrastructure elements.

* * * * *